April 5, 1949.  C. F. COAKE  2,466,382
VARIABLE RELUCTANCE DEVICE
Filed Aug. 5, 1944  2 Sheets-Sheet 1
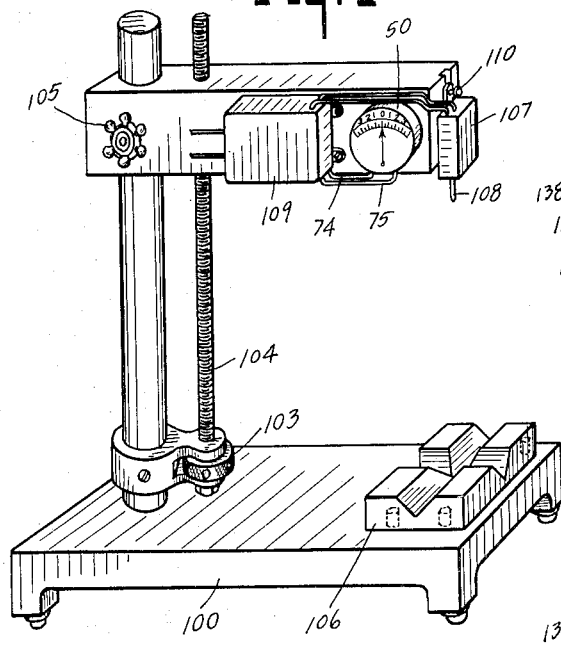
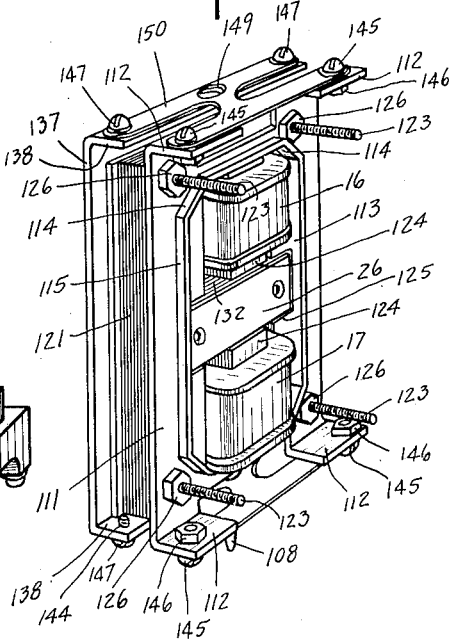
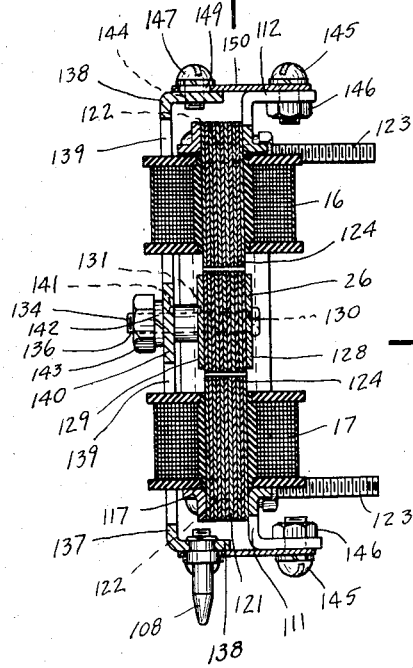
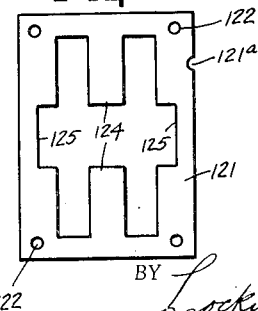
INVENTOR.
CHARLES F. COAKE.
BY
Lockwood, Goldsmith & Galt
ATTORNEYS.

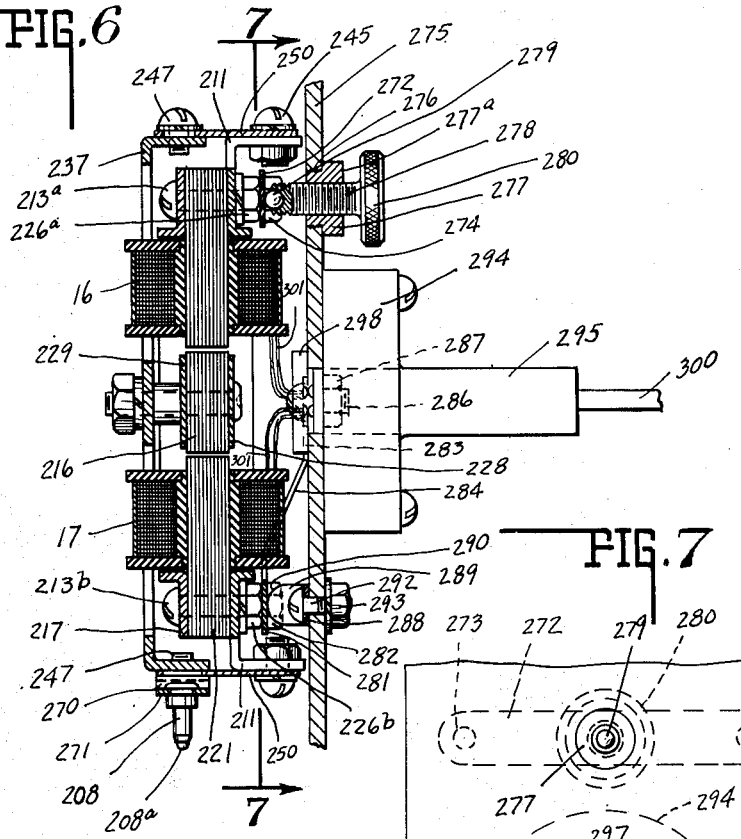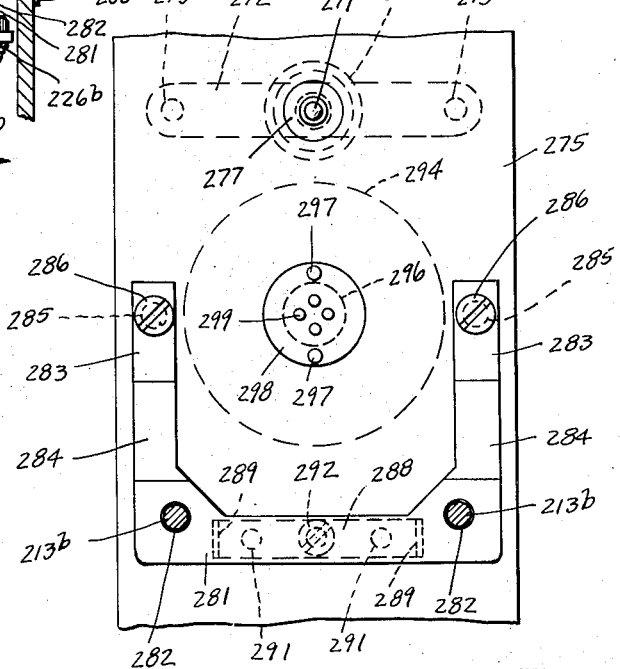

Patented Apr. 5, 1949

2,466,382

UNITED STATES PATENT OFFICE 2,466,382

VARIABLE RELUCTANCE DEVICE

Charles F. Coake, Indianapolis, Ind., assignor to Senn Corporation, New Augusta, Ind., a corporation Application August 5, 1944, Serial No. 548,281

6 Claims. (Cl. 171—242)

This invention relates to a variable reluctance device such as a micro-limit indicating apparatus for precision measurement of dimensions, quantities, pressures and the like.

The present invention has as its object the production of a variable reluctance device capable of indicating micro-measurements, as are now required in production standards, by means of a simple but responsive and positive instrument available at low cost, capable of operating for industrial use, and wherein such instrument may be employed with the same accuracy as has heretofore been available only in the more costly and elaborate laboratory equipment and accessories.

One feature of the invention resides in the stylus type of apparatus indicator selected for exemplification herein, permitting the use of springs having, for example, a force of but twenty grams instead of a minimum of two ounces as heretofore employed in stylus measuring equipment. The result thereof is that the present invention may be used for gauging surfaces without the stylus pressure marring the finish thereof.

A further feature of the invention resides in the precision production of a laminated armature and a laminated field magnet including the cores, and wherein the laminations thereof may be rapidly and precisely stamped out to provide a precision formed air gap of predetermined width. By means of this feature in the construction of the instrument, an extremely narrow air gap may be utilized to obtain greater precision capacity than heretofore. Thus, the apparatus herein disclosed could be operated with such sensitivity that the most accurately ground surface would record variations. For example, an air gap of as low as .002 of an inch would be possible, which through amplification would be readable over a range of .0004 ampere to record a surface variation of .0000014 inch upon a meter as above referred to.

Still a further feature of the invention resides in adjustably mounting the gauging instrument proper so that vernier adjustable positioning thereof as it were produces in effect the desired adjustment or initial positioning of the work contacting member.

This feature is accomplished by mounting said instrument to swing, as it were, upon an arc, lateral displacement along the arc resulting in vertical adjustment or positioning of the work contacting point within the range of adjustability.

Other objects and features of this invention will be set forth more fully hereinafter.

The full nature of the invention will be understood from the accompanying drawings and the following description and claims:

In the drawings Fig. 1 is a perspective view of the comparator structure including the stylus embodiment type of unit, meter, etc.

Fig. 2 is a perspective view of the stylus including unit with casing removed.

Figs. 3 and 4 are transverse sections thereof.

Fig. 5 is an elevational view of one field lamination of the comparator structure.

Fig. 6 is a view comparable to Fig. 3 and of the vernier adjustable type of gauging instrument.

Fig. 7 is an elevational view of the adjustable mounting arrangement and is taken approximately in the plane 7—7 of Fig. 6 and in the direction of the arrows.

Reference will now be had to Fig. 1 wherein one form of a structure including an armature, magnet and stylus is illustrated in detail. Therein 50 indicates the meter or indicator, 16 an upper coil, 17 the lower coil and 26 the armature.

In Fig. 1, by way of example, there may be provided a base 100 from which rises a standard (or if desired standards) 101 upon which is slidably mounted an arm 102 overhanging the base and which is adjusted vertically toward and away from same by any suitable means as handwheel 103 and screw 104. Clamp 105 secures the arm 102 in fixed position or spaced relation to base 100 which may support a suitable stock or work supporting auxiliary base 106. Rigid with and preferably adjustable on the arm 102 is the stylus mounting unit 107 from which depends the work engaging stylus 108. Meter 50 may be carried by the arm 102, base 100 or may be detached from both. The several electrical and like elements necessary for operation are included in a unit 109 and same also is carried by the arm or base or may be similarly detached.

Herein for convenience, and to provide a complete portable unit, the meter 50 and unit 109 are shown carried by the arm. The stylus 108 is intended to move vertically in the example illustrated in Fig. 1, wherefore the base 100 should be placed upon a substantially horizontal support, such as a table or work bench. If desired, the base 100 may be provided with adjustable feet and a level arrangement so that the complete device shown in Fig. 1 can be adjusted to have its upright or standard 101 truly vertical.

In the present example, the arm 102 is adjusted so that the stylus 108 can engage exactly dimensioned stock upon auxiliary base 106, same being suitably formed for stock reception and mounting, the structure base 100 being capable of interchangeably supporting thereon suitable bases 106. The arm 102 is then clamped in the adjusted position. The circuit is then adjusted so that the indicator (needle) on meter 50 indicates zero when the stylus contacts the exactly dimensioned work or gauge block and the armature 26 is in neutral position in the air gap, the necessary physical adjustment, if any, for shifting vertically the unit 107 on the arm, being made at 110.

When this has been accomplished, the exactly dimensioned stock (or template) is removed and production run pieces of work are substituted. If the stock, so tested, is undersize in micro inches, the meter needle will indicate same by moving to the left. If oversize in micro inches, the needle will move to the right. If exactly to size, the needle will remain at the zero position on the dial.

Linear departures or differences in micro inches are indicated in micro amperes on the meter wherein the arcuate scale has successive divisions, all equal and representing and indicating successive linear increments and decrements. The meter indication preferably is double the actual dimensional difference, wherefore in operation the relationship is of an enlarging character rather than of a reducing character.

Reference will now be had to Figs. 2, 3 and 4 wherein the stylus unit 108 and parts thereof are more fully illustrated in detail, including coils 16 and 17, armature 26 and stylus 108. In Fig. 2 the casing is omitted. Said unit embodies a base plate 111 having flanges 112 projecting outwardly therefrom at each end. This plate is centrally apertured at 113 with angled corners as indicated at 114, said aperture being defined by a reenforcing flange 115. The angled corners provide sufficient area for bolt receiving apertures 116 through which bolts 123 extend. A somewhat similar plate 117, apertured at 118 and angled at the corners as at 119, has its central aperture 119 as defined by a reenforcing rib 120.

Interposed between said plates 111, 117 and clamped thereby are a plurality of field laminations 121, see Fig. 5. Each is rectangularly outlined and provided at each corner with an aperture 122 for receiving a bolt 123. Herein each lamination includes an H-shaped slot forming two longitudinally aligned core forming projections 124 extending inwardly towards each other from the ends of said lamination and having a predetermined and precision formed pole gap therebetween.

The H-shaped slot is laterally enlarged at its central portion, and these enlargements indicated at 125 extend oppositely to each other and are of a length equal to that of the pole gap. This, however, is not the air gap previously mentioned.

As shown in Fig. 5, lamination 121 is notched at 121a. All laminations are die formed, consequently may have a slight burr at the edge or edges. Notch 121a is a pilot or locator arrangement, so all laminations stack up properly, that is with such burrs facing the same direction.

Nuts 126 on bolts 123 in holes 122 then secure the laminations and plates together in clamped and contacting relation. The flanging so stiffens the plates, that while of comparatively light gauge, they do not centrally buckle or bulge outwardly, thereby eliminating the necessity for central clamping bolts or use of heavier gauge plates.

The coil 16 is mounted upon the upper core and the coil 17 is mounted upon the lower core. As illustrated, these are seated at the extreme ends of the slots and secured in these positions by friction fits or by suitable means. When so secured, they are symmetrically positioned and their adjacent ends are substantially equidistant from the adjacent end or pole face of the respective core upon which the coil is mounted.

The armature includes a pair of rectangular plates 128 and 129 having at each end central apertures 130 and 131 respectively. Therebetween and clamped thereby are rectangular armature laminations 132 centrally apertured at each end as at 133. Preferably, the number of armature laminations slightly exceeds the number of core laminations. In the example illustrated, there are six field or stator laminations and seven or eight armature laminations of the same thickness, it being understood that the aggregate thickness of the latter should exceed that of the former.

In the several aligned apertures 130, 131 and 133 are studs 134. Each has a collar-like enlargement 134a that bears upon the outer face of plate 129. The more remote ends of the studs are enlarged by indenting as at 135, upon the outer face of plate 128. In this manner the armature laminations are assembled and tightly clamped together under a prescribed pressure. The collar end of each stud is threaded as at 136.

An armature supporting plate 137 is formed with upper and lower flanges 138 directed toward the base plate 111 in the same direction as the lugs 112 thereof with the flanges 138 partially straddling the field structure, thus resulting in a semi-nested arrangement.

Plate 137 is centrally apertured as at 139, and extending inwardly and centrally towards each other are provided ears 140 apertured at 141 to receive the threaded ends 136 of said armature studs 134. Lock washers 142 and nuts 143 rigidly secure the plate 137 to the armature while the collar portions 134a space said armature from said plate 137.

Each flange 138 near the ends thereof is suitably apertured as at 144. An H-shaped spring 150 of comparatively light force (i. e. 20 grams) is apertured at each end. Screws 145 (with nuts 146) secure a longitudinally aligned pair of spring ends to the lugs 112, while screws 147 secure the other longitudinally aligned pair of spring ends to the flanges 138 in threaded engagement therewith.

Each spring 150 may be notched laterally but preferably is apertured as at 149 so as to be interchangeable for mounting at either end and provide clearance for the stylus 108 which is rigidly secured to either end flange 138.

To utilize plate stock of considerably lighter gauge than that normally required and for strengthening purposes, the ears 140 are joined together, as illustrated, to form a central transverse portion extending across the aperture 139 in the plate 137.

Each of the said plates and laminations are precision formed by stamping, which when assembled together constitute a field magnet and an included armature, the total gap between the pole faces being of a predetermined amount. The armature, having a predetermined depth of a slightly lesser amount, is mounted between the pole faces, wherefore there results an air gap (singular or multiple) of approximately .014 of an inch. However, due to the precision production of the laminations, such total air gap may be reduced to as low as .002 of an inch as above suggested, for detection and measurement of ground surface variation.

Any suitable means may be employed to mount the magnet and stylus unit 107 upon the arm 102, and for this purpose bolts 123 may be elongated, as illustrated in Fig. 3. The flanging on base plate 111 and intermediate plate 117 also serves as a retainer, when desired, for holding the adjacent nut against rotation, or the head of the bolt if same be of polygonal outline.

To facilitate assembly of the magnet unit, the stator is assembled and the coils successively applied to the respective cores by lateral presentation to the armature receiving gap therein and when registered with the pole, slipped back thereon. Following coil application, the armature with its supporting plate and stylus is juxtapositioned thereto so that the armature is interposed between the pole faces and then the spring connection between the stator and the armature is effected, or if desired, the armature may be positioned as aforesaid, then the stylus supporting plate spring connected to stator, and then the armature connected to stylus supporting plate.

In Figs. 6 and 7 a vernier type adjustable mounting for the stylus including unit is illustrated as well as certain desirable improvements in such instrument or unit. In said figures 237 and 211—217 indicate armature and field supporting plates similar to plates 137 and 111—117, respectively.

Field laminations 221 and armature laminations 216 are comparable to laminations 121 and 116. Field coils 16 and 17 are suitably mounted upon the field poles as before. The armature laminations are secured between plates 228—229 and the armature is suitably secured to plate 237. Said plate is yieldingly connected to the field supporting plate 211 by the upper and lower H-shaped springs 250.

In Figs. 1 to 4 bolts 123 secure the work engaging instrument rigidly to the overhanging arm of the device and stylus 108, see Fig. 3, is rigid with plate 137. Herein the unit is adjustably mounted as hereinafter described and the work engaging stylus is indirectly supported by the armature supporting plate.

Screws 247 and 245 secure springs 250 to connect plates 237 and 211 as aforesaid. Screws 247 herein simultaneously secure to plate 237 the opposite ends of a strap 270 having centrally apertured offset portion 271 in which is staked stylus body portion 208 terminating in a contact ball 208a.

Herein the two upper screws 213a which with nuts 226a secure together plates 217 and 211 with interposed field laminations 221, also support a smooth surfaced cross member 272 apertured at 273 and nuts 274 secure said member to the field structure.

The supporting base plate 275 is tapped as at 276 to receive and support internally threaded member 277. Mounted therein is threaded member 278 which at its end adjacent cross member 272 mounts a contact ball 279. The opposite end is provided with knurled knob or wheel 280. The face 277a of member 277 serves as a stop and limits threading movement of member 278 toward the field structure. By way of example only, the thread illustrated herein is ¼–32. Note from Fig. 7 that ball 279 is positioned centrally relative to the field structure and cross member 272 which may be of spring material since it has a highly polished smooth surface for ball contact.

The lower screws 213b mount field structure uniting nuts 226b. A U-shaped spring having a central portion 281 is apertured at 281a for screw reception and nuts 282 secure said spring to the field structure. Each arm 283 of said spring includes an angular offsetting portion 284 and said ends are apertured at 285 to receive screws 286 that mount said spring ends on base plate 275. Nuts 287 secure the aforesaid together.

Hence, the field structure is suspendingly and laterally supported from and relative to base plate 275. A U-shaped bearing member includes central portion 288 and two angular ends 289 terminating in curved surfaces 290. Plate 275 and portion 288 have cooperating locating means 291. A central screw 292 and nut 293 rigidly mounts this bearing structure upon said base plate 275.

Since the central portion 281 of the U-shaped spring has initially an inclination relative to the plane of said ends 283 and when mounted, such central portion is parallel thereto the spring is stressed and said central portion bears upon the curved bearing faces 290 of the U-shaped bearing member.

Running member 278 in or out of member 277, accordingly moves the lower end of the field structure as well as the upper end, since the latter is yieldingly mounted as it were, and the contact ball 208a moves towards or away from base plate 275 respectively. This movement herein has the effect of raising or lowering the lower contact point of ball 208a relative to a horizontal datum plane. The structural dimensions herein are such that turning member 280—278 one turn or a lateral movement of ball 279 one thirty-second of an inch provides a vertical adjustment of eight thousandths of an inch. A quarter turn of screw 278—280 accordingly provides two thousandths of an inch vertical adjustment of ball 208a.

The foregoing provides a vernier adjustment, as it were, of contact ball 208a so that stylus contact for predetermined dimensioning may be rapidly effected. The swing of the unit in this adjustment has substantially no effect upon the relative operation of the armature, field and coils. In other words, the operation thereof is independent of such adjustment.

Suitably secured to the back of base plate 275 is member 294 with tubular extension 295. The back plate is apertured to 296 to register with the bore through said member and its extension. Secured as at 297 to the opposite face of the base plate is the insulation member 298 having metallic eyelets 299 therein.

A rubber clad multiple line conduit 300 has its exposed line ends seated in eyelets 299. The coils 16 and 17 have their flexible connections 301 terminating in exposed ends similarly but oppositely seated in said eyelets. The two confronting exposed ends are suitably secured together and in said eyelet for electrical connection.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A variable reluctance unit comprising a plurality of field laminations, a pair of plates clampingly securing same together in stator formation, each plate being centrally apertured and of frame type and each lamination having a similar exterior outline and with an H-shaped opening therethrough, an armature comprising a plurality of laminations, a pair of plates similar thereto and clampingly securing same together in armature formation, the armature being receivable by the transverse portion of the stator H-shaped opening, a plate supporting said armature and positioned at one side of same, and spring means yieldingly supporting the armature in neutral position and secured to one of the stator plates and the armature supporting plate.

2. A unit as defined by claim 1 wherein each stator plate central aperture is defined by a flange, the flanges on said plates extending away from the plate included laminations.

3. A unit as defined by claim 1 wherein the armature supporting plate includes at each end a flange, the two flanges being directed toward the armature, the stator being nestable between the armature supporting plate flanges.

4. A unit as defined by claim 1 wherein the armature supporting plate includes at each end a flange, the two flanges being directed toward the armature, the stator being nestable between the armature supporting plate flanges, and the spring means comprising a pair of H-shaped light springs, one at each end of the unit and having a pair of longitudinally aligned arm portions secured at the ends to the adjacent flange on the armature supporting plate.

5. A unit as defined by claim 1 wherein the armature supporting plate includes at each end a flange, the two flanges being directed toward the armature, the stator being nestable between the armature supporting plate flanges, and the spring means comprising a pair of H-shaped light springs, one at each end of the unit and having a pair of longitudinally aligned arm portions secured at the ends to the adjacent flange on the armature supporting plate, the stator plate, more remote from the armature supporting plate, at the ends having similarly directed flange means for anchorage of the ends of the other longitudinally aligned arm portions of the springs.

6. A unit as defined by claim 1 wherein the central opening of one of the stator plates has angled corners and a flange extends outwardly from that plate at said corners, and polygonal outline headed clamping means extending through the laminations and clampingly connecting same and the stator plates together, the polygonal head being juxtapositioned to the flange for locking purposes.

CHARLES F. COAKE.

REFERENCES CITED

The following references are of record in the file of this patent:

UNITED STATES PATENTS

| Number | Name | Date |
|---|---|---|
| 1,930,269 | Greenidge | Oct. 10, 1933 |
| 2,115,351 | Terry et al. | Apr. 26, 1938 |
| 2,180,175 | Sivertsen | Nov. 14, 1939 |
| 2,196,809 | Hoadley | Apr. 9, 1940 |
| 2,213,328 | Schaper | Sept. 3, 1940 |
| 2,231,702 | Burgwin et al. | Feb. 11, 1941 |
| 2,240,184 | Hathaway | Apr. 29, 1941 |
| 2,370,073 | Reason | Feb. 20, 1945 |
| 2,371,973 | Minton | Mar. 20, 1945 |